United States Patent [19]
McCutcheon

[11] Patent Number: 6,145,537
[45] Date of Patent: Nov. 14, 2000

[54] VALVE POSITION INDICATOR

[76] Inventor: Michael R. McCutcheon, 10915 Hessong Bridge Rd., Thurmont, Md. 21788

[21] Appl. No.: 09/406,411

[22] Filed: Sep. 27, 1999

[51] Int. Cl.⁷ .................................................. F16K 37/00
[52] U.S. Cl. ........................... 137/553; 116/277; 116/284
[58] Field of Search .................................. 137/551, 553, 137/556; 116/277, 284, 285, 309

[56] References Cited

U.S. PATENT DOCUMENTS

| | | | |
|---|---|---|---|
| 473,488 | 4/1892 | Wood | 137/553 X |
| 577,147 | 2/1897 | Paul | 137/553 X |
| 2,966,923 | 1/1961 | Fennema | 137/553 |
| 3,367,365 | 2/1968 | Stevens | 137/553 |
| 3,804,056 | 4/1974 | Lee et al. | 116/125 |
| 4,258,748 | 3/1981 | Guman | 137/553 |
| 4,494,566 | 1/1985 | Sinclair et al. | 137/556 |
| 5,469,805 | 11/1995 | Gibbs | 137/556 X |

*Primary Examiner*—Kevin Lee
*Attorney, Agent, or Firm*—Donald A. Kettlestrings

[57] ABSTRACT

A valve position indicator for visually indicating the open or closed position of a valve from a distance and from various angles includes a support; a hollow, elongated member rotatably mounted on the support; and an indicator member having indicia thereon representative of a valve-open position and a valve-closed position, the indicator member adjustably connected within the elongated member for selectively displaying either the valve-open or the valve-closed indicium.

10 Claims, 1 Drawing Sheet

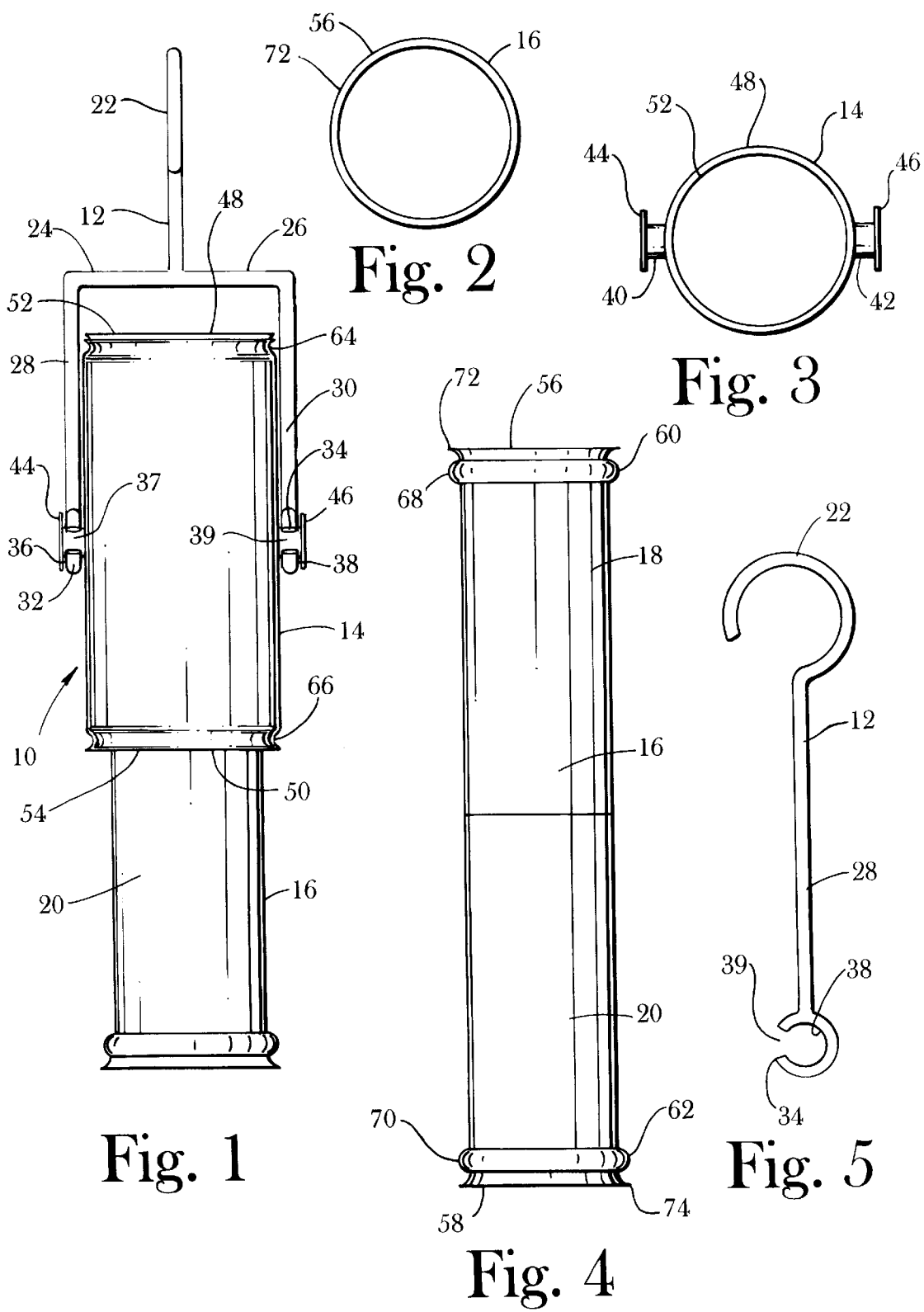

VALVE POSITION INDICATOR

BACKGROUND OF THE INVENTION

This invention relates to a position indicator and more particularly to a valve position indicator for clearly displaying the open or closed position of a valve from a distance and from various angles.

It has been the general practice to use red or green paper tags to indicate the open or closed position of a valve. If the valve is closed, a red tag is attached onto or adjacent to the valve and the green tag is removed or positioned nearby. Conversely, if the valve is open, a green paper tag is attached to the valve or adjacent thereto. Although this method of valve position indication has served the purpose, it has not proved entirely satisfactory for various reasons. For example, if the tag not being used to indicate valve position is hung or otherwise positioned anywhere nearby, it may be confused with the tag which actually shows valve position. Because of the configuration of the tags, it is sometimes difficult to view the indicator tag from different angles. Also, the tags are frequently lost or misplaced.

It is, therefore, an object of the present invention to provide a valve position indicator.

Another object is to provide such an indicator which is easy to use.

A further object is the provision of such an indicator which can be viewed from a distance and from various angles to indicate the open or closed position of a valve.

Still another object is to provide such an indicator which will display either a valve-open indicium or a valve-closed indicium without both indicia being simultaneously visible.

Additional objects and advantages of the invention will be set forth in part in the description which follows, and in part will be obvious from the description, or may be learned by practice of the invention. The objects and advantages are realized and attained by means of the instrumentalities and combinations particularly pointed out in the appended claims.

SUMMARY OF THE INVENTION

To achieve these and other objects, the present invention provides a valve position indicator, comprising: a support; a hollow, elongated member rotatably mounted on the support; and an indicator member having indicia representative of a valve-open position and a valve-closed position, the indicator member adjustably connected within the elongated member for selectively displaying either the valve-open or the valve-closed indicium.

It is to be understood that both the foregoing general description and the following detailed description are exemplary and explanatory but are not restrictive of the invention.

BRIEF DESCRIPTION OF THE DRAWINGS

The accompanying drawings, which are incorporated in and constitute a part of this specification, illustrate a preferred embodiment of the invention and, together with the description, serve to explain the principles of the invention.

FIG. 1 is an elevation view showing indicator assembly 10;

FIG. 2 is a top plan view showing indicator member 16;

FIG. 3 is a top plan view showing elongated member 14;

FIG. 4 is an elevation view showing indicator member 16; and

FIG. 5 is a side elevation view showing support 12.

DESCRIPTION OF THE PREFERRED EMBODIMENT

With reference now to the drawings, wherein like reference characters designate like or corresponding parts throughout the several views, there is shown a valve position indicator assembly 10 which includes a support 12. A hollow, elongated member 14 is rotatably mounted on support 12, and an indicator member 16 is adjustably connected to elongated member 14. Indicator member 16 has indicia thereon representative of a valve-open position and a valve-closed position, and indicator member 16 is adjustably connected to elongated member 14 for selectively displaying either the valve-open or the valve-closed indicium.

The valve-open indicium 18 is preferably the color green, and the valve-closed indicium 20 is preferably the color red. Alternatively, or in addition thereto, valve-open indicium 18 may include the word "open" and valve-closed indicium 20 may include the word "shut" or the word "closed". Other indicia for indicating valve-open and valve-closed may be used.

Support 12 preferably includes a hook 22 for suspending indicator 10 from a valve or valve-related structure, and a yoke 24 connected to hook 22 for rotatably holding elongated member 14. Instead of hook 22, indicator 10 may include another conventional structure for attaching position indicator 10 to a valve or to a valve-related structure.

In accordance with the invention, yoke 24 includes a first supporting member 26 connected to hook 22. First and second arm members 28, 30 are connected to and extend downwardly from first supporting member 26. First and second receiving members 32, 34 are connected to arm members 28, 30, respectively, for rotatably receiving and holding elongated member 14. Receiving members 32, 34 define openings 36, 38, respectively. Receiving members 32, 34 also define openings 37, 39, respectively.

Elongated member 14 includes first and second axle members 40, 42 which extend outwardly from elongated member 14 and are positioned in alignment with each other. Axle members 40, 42 are rotatably positioned within openings 34, 36 of receiving members 32, 34, respectively, for enabling rotational movement of elongated member 14 with respect to support 12. Axle members 40, 42 include first and second flange elements 44, 46, respectively, for holding elongated member 14 on support 12 and for holding axle members 40, 42 in rotational positions within openings 36, 38, respectively.

Elongated member 14 defines first and second opposed open ends 48, 50 and further includes first and second retaining means 52, 54 located at ends 48, 50, respectively, for releasably retaining indicator member 16 in first and second fixed positions, respectively, with respect to elongated member 14.

Indicator member 16 defines first and second opposed ends 56, 58 and further includes first and second engaging means 60, 62 located at ends 56, 58, respectively, of indicator member 16 for selectively releasably engaging first and second retaining means 52, 54, respectively.

In accordance with the invention, retaining means 52, 54 preferably include indentations or depressions 64, 66, respectively, which reduce the interior diameter of elongated member 14. Engaging means 60, 62 preferably include ring elements 68, 70, respectively, and outwardly extending flange elements 72, 74, respectively.

Indicator member 16 includes a first indicium 18 located adjacent to first end 56 of indicator member 16 and a second indicium 20 located adjacent to second end 58 of indicator member 16. Elongated member 14 and indicator member 16 are of predetermined lengths relative to each other to enable only first indicium 18 or second indicium 20 to be visible when indicator member 16 is connected within elongated member 14. Elongated member 14 and indicator member 16 are each tubular in shape, and the indicator member is preferably hollow.

In operation and use, hollow, elongated member 14 is rotatably attached to support 12 by rotatably positioning axle members 40, 42 into openings 36, 38, respectively. Axle members 40, 42 are pushed through openings 37, 39 to position axle members 40, 42 within openings 36, 38. Receiving members 32, 34 are slightly flexible so that openings 37, 39 flex open slightly to enable axle members 40, 42 to be snapped into position within openings 36, 38. The diameters of axle members 40, 42 are preferably slightly greater than the dimensions of openings 37, 39 so that receiving members 32, 34 must be slightly flexible to permit axle members 40, 42 to be snapped into position within openings 36, 38. The diameters of openings 36, 38 are slightly greater than the diameters of axle members 40, 42 so that axle members 40, 42 can be rotated within openings 36, 38, respectively.

Indicator member 16 is inserted into hollow, elongated member 14, and first end 56 of indicator member 16 is positioned adjacent to first open end 48 of elongated member 14. Indicator member 16 is removably connected to elongated member 14 by forcing flexible flange element 72 of indicator member 16 through indentation or depression 64 of elongated member 14. Flange element 72 will then be positioned to engage first open end 48 of elongated member 14, and ring element 68 of indicator member 16 will be positioned beneath indentation or depression 64 of member 14 to lock indicator member 16 into position with respect to elongated member 14.

In this position, valve-closed indicium 20 will be visible and no portion of valve-open indicium 18 will be visible. Indicator 10 is then suspended from the valve (not shown) or from structure (not shown) adjacent to the valve by positioning hook 22 over a portion of the valve or over a portion of the structure adjacent to the valve.

Because of the tubular configuration of indicator member 16, valve-closed indicium 20 can be easily viewed from a distance and from various angles to show that the valve is closed.

To change indicator 10 from indicating a valve-closed condition to a valve-open condition, indicator member 16 is adjusted with respect to elongated member 14 so that second end 58 of indicator member 16 is positioned adjacent to second end 54 of retaining member 14. This can be done without removing elongated member 14 from support 12 by simply rotating elongated member 14 within openings 36, 38 so that indicator member 16 can be slideably and axially moved within elongated member 14.

This slideable adjustment of the position of indicator member 16 within elongated member 14 is accomplished by pushing end 58 of indicator member 16 to force ring element 68 through and past indentation 64. Indicator member 16 is then axially moved through elongated member 14 until ring element 70 of indicator member 16 engages depression 66 of elongated member 14. Ring element 70 is then forced through flexible depression 66 until flange element 74 engages second end 50 of elongated member 14. Indicator member 16 is, thus, locked into position with valve-open indicium 18 being visible.

Elongated member 14 is then rotated within openings 36, 38 so that valve-open indicium 18 is positioned beneath elongated member 14. Indicator 10 is then repositioned onto or adjacent to the valve by use of hook 22.

Of course, if the location of indicator 10 on the valve or adjacent to the valve is comfortably accessible, the readjustment of the position of indicator member 16 within elongated member 14, as previously described, can be accomplished even without removing indicator 10 from the valve or from the structure adjacent to the valve.

Indicator 10 and all of its components are preferably comprised of a conventional durable plastic material.

This invention provides a valve position indicator for visually indicating the open or closed position of a valve from a distance and from various angles.

The invention in its broader aspects is not limited to the specific details shown and described, and departures may be made from such details without departing from the principles of the invention and without sacrificing its chief advantages.

What is claimed is:

1. A valve position indicator, comprising:
    a support;
    a hollow, elongated member rotatably mounted on said support; and
    an indicator member having indicia representative of a valve-open position and a valve-closed position, said indicator member adjustably connected to said elongated member for selectively displaying either said valve-open or said valve-closed indicium.

2. An indicator as in claim 1 wherein said indicator member is adjustably connected within said hollow, elongated member.

3. An indicator as in claim 2 wherein said support includes:
    a hook for suspending said indicator from a valve or valve-related structure; and
    a yoke connected to said hook for rotatably holding said elongated member.

4. An indicator as in claim 3 wherein said- yoke includes:
    a first supporting member connected to said hook;
    first and second arm members connected to and extending from said first supporting member; and
    first and second receiving members connected to said first and second arm members for rotatably receiving and holding said elongated member.

5. An indicator as in claim 4 wherein said elongated member includes first and second axle members extending outwardly from said elongated member and positioned in substantial alignment with each other, said first and second axle members rotatably positioned in said first and second receiving members, respectively, for enabling rotational movement of said elongated member with respect to said support.

6. An indicator as in claim 5 wherein said elongated member defines first and second opposed open ends and further including first and second means located at said first and second ends, respectively, for releasably retaining said elongated member in first and second fixed positions, respectively, with respect to said elongated member.

7. An indicator as in claim 6 wherein said indicator member defines first and second opposed ends and further including first and second means located at said first and second ends, respectively, of said indicator member for selectively releasably engaging said first and second retaining means, respectively.

8. An indicator as in claim 7 wherein said indicator member includes a first indicium located adjacent to said first end of said indicator member and a second indicium located adjacent to said second end of said indicator member and wherein said elongated member and said indicator member are of predetermined lengths relative to each other to enable only said first or second indicium to be visible when said indicator member is connected within said elongated member.

9. An indicator as in claim 8 wherein said first and second axle members include first and second flange elements, respectively, for holding said elongated member on said support.

10. An indicator as in claim 9 wherein said elongated member and said indicator member are each tubular in shape.

* * * * *